United States Patent Office 3,429,714
Patented Feb. 25, 1969

3,429,714
BAKER'S ALL-PURPOSE, PLASTIC SHORTENING
COMPOSITION
Kenneth W. Nelson, Springfield Township, Hamilton County, Ohio, assignor to The Procter & Gamble Company, Cincinnati, Ohio, a corporation of Ohio
No Drawing. Filed Nov. 22, 1965, Ser. No. 509,219
U.S. Cl. 99—118          9 Claims
Int. Cl. A23d 5/00

ABSTRACT OF THE DISCLOSURE

Baker's all-purpose, plastic shortening useful for the preparation of high volume cakes and stable cream icings, which comprises a shortening base and a combination of three additives in certain amounts and proportions. The three additives are: monoester of glycerol and fatty acid; monoester of propylene glycol and fatty acid; and monoester of polyoxyethylene sorbitan and fatty acid.

---

This invention relates to a novel shortening composition. More particularly, this invention relates to a baker's all-purpose, plastic shortening which is equal to or better than conventional baker's shortenings in its ability to produce under commercial conditions both high volume cakes and related baked products having fineness and softness in texture and stable cream icings having high specific volume.

A large variety of shortenings are available on the market today for various cooking, baking and other food purposes. Most of these shortenings are essentially glycerides of one sort or another; they are generally derived from animal, vegetable and marine fats and oils.

Although the animal fats, such as butterfat, lard and tallow, generally are solid or "plastic" in consistency, the naturally-occurring vegetable oils, such as olive, corn, soybean and cottonseed oils, are generally liquid in consistency. These naturally-occurring liquid vegetable oils are of great important as cooking and salad oils but frequently are not best suited for certain important baking purposes, for example, for preparing bakery products which require the production of a highly developed batter or dough structure, such as a layer cake. In order to be made more useful for such purposes, these oils are usually subjected to special chemical or physical processing, such as plasticizing, or else combined with certain edible additives which fortify the base oil.

As mentioned above, one of the most common treatments for improving the baking properties of the naturally-occurring liquid vegetable oils is to plasticize them. This is usually accomplished by partially hydrogenating the entire mass of the oil, or by the addition of a small amount of highly hydrogenated triglyceride to the oil, accompanied with suitable chilling and crystallization techniques.

As used herein, the term "plastic" shortening is meant to define a solid shortening which has a yield point high enough to prevent product flow or product deformation under its own weight in ordinary commercial unit quantities but which is moldable and spreadable at ordinary room temperatures (70° F. to 100° F.).

It has been known for many years that improvements in plastic shortenings suitable for cake baking purposes, particularly for cakes of the so-called "high-ratio" variety, can be obtained by the employment of mono- and diglycerides or so-called "superglycerinated fats" in the shortenings. More recently, numerous other emulsifier-type substances have been suggested for use in cake shortenings. Examples of the more recently developed emulsifying agents for cake baking purposes are propylene glycol monostearate, citric acid esters of monoglyceride and lactylated esters of various sorts. Although many of the newer type emulsifiers are reported to be equivalent to or better than conventional mono- and diglycerides, shortening technologists continue to search for more universally suitable emusifying agents or combinations of emulsifying agents which can be used by bakers to improve their baking operations and the quality of their products. While some of the newer emulsifying agents greatly improve upon certain properties and characteristics of shortening, they frequently introduce other undesirable properties which on balance, tend to offset the improvements obtained by their presence. For example, on the one hand, certain additives may improve the volume of cakes but may tend to decrease the volume of icings made with the shortening. On the other hand, certain other additives may improve the volume of icings but may tend to decrease the volume of cakes made with the shortening. As another example, certain additives may have a pronounced improving effect upon the volume of certain types of layer cakes such as yellow or chocolate cakes but may tend to have an unfavorable effect upon the volume of white layer cakes. Still another example involves the use of additives which may be useful in layer cakes but may be of little or no use in other types of bake goods such as pound cakes and sweet yeast-raised baked goods.

In a study of the problems relating to all-purpose plastic shortenings for commercial bakeries, it has been unexpectedly discovered that a unique combination of shortening additives can be used to improve the quality of commercially prepared bakery products. Accordingly, the primary object of this invention is to provide an all-purpose plastic shortening containing such a combination of additives. It is a further object of this invention to provide a process for preparing a commercial bakery shortening which contains at least three emulsifying agents, the combined presence of which produces an all-purpose plastic shortening. And a still further object of this invention is to provide an all-purpose plastic shortening particularly useful in the commercial production of all types of layer cakes, pound cakes, sweet yeast-raised doughs and icings. Other objects are to improve the water-holding capacity of cream icings; to provide for more rapid mixing of cake batters; and, to obtain smoother, less curdled cake batters.

In general, the invention comprises an all-purpose, plastic, glyceride shortening composition suitable for use in commercial baking operations which comprises a shortening base containing from about 4.5% to about 8.0%, by weight of the shortening composition, of a combination of additives totalling about 100 parts by weight comprising from about 55 to about 75 parts by weight of monoester of glycerol and fatty acid having from about 12 to about 22 carbon atoms and a complement of from about 45 to about 25 parts by weight of a mixture of (a) monoester of propylene glycol and fatty acid having from about 12 to about 22 carbon atoms and (b) monoester of polyoxyethylene sorbitan containing about 20 oxyethylene units per molecule and fatty acid having from about 16 to about 18 carbon atoms, the ratio of (a) to (b) being from about one to about ten parts by weight of (a) to about one part by weight of (b), and the concentration of (a) not exceeding about 2.4% of the weight of the total shortening composition.

Although the precise mechanism by which the combination of additives in this invention cooperate is not completely understood, it is known that substantially improved performance is obtained with these additives in a baker's all-purpose, plastic shortening. Improvements are obtained in cake and icing volume with an all-purpose, plastic shortening system employing these additives in combination compared to shortening systems from which one or more of these additives is left out.

Some of the additives of this invention are commercially available and have been previously known to be useful in shortenings. The present invention is not predicated on the use of these additives in shortening either alone or in binary combination but rather the invention resides in the unique combination of all three of the above-defined additives in the concentrations and proportions described and in the shortening improvements obtained with this combination.

In the co-pending application of Darragh and Nelson, U.S. Ser. No. 422,048, filed Dec. 29, 1964, there is disclosed an all-purpose shortening system which contains a quaternary combination of additives which cooperate to provide improvements in plastic as well as liquid base fats and oils. By way of contrast, the present shortening contains a ternary combination of additives which cooperate to provide improvements in plastic as distinguished from liquid shortening systems. Two of the four additives used in the quaternary combination of additives in the copending application of Darragh and Nelson (namely, the monoester of glycerol and fatty acid and the monoester of polyoxyethylene sorbitan and fatty acid) are used in the ternary combination of additives in the present case in addition to the monoester of propylene glycol and fatty acid which is not required in said co-pending application.

The substantial improvements obtained in the present plastic shortening systems with the ternary combination of additives are not predictable from the individual performance of the additives or the performance of binary combinations of these additives. Thus, on the one hand, it has been found that a combination of the glycerol monoester and propylene glycol monoester in the shortening provides good layer cake volume but decreases the volume of cream icings from that obtained with the glycerol monoester by itself in the shortening. On the other hand, it has been found that the combination of the glycerol monoester and polyoxyethylene sorbitan monoester provides good cream icing volume but decreases the volume of layer cakes from that obtained with the glycerol monoester by itself in the shortening. Unexpectedly, the ternary combination of all three additives provides substantially better volume with both layer cakes and cream icings than is obtained with the glycerol monoester.

In general, the fatty glycerides which are employed in the plastic shortening of this invention as a shortening base can be, or can be derived from, animal, vegetable or marine fats and oils; they can also be synthetically produced. These glycerides can contain saturated or unsaturated "long-chain" acyl radicals having from about 12 to about 22 carbon atoms such as lauroyl, lauroleoyl, myristoyl, myristoleoyl, palmitoyl, palmitoleoyl, stearoyl, oleoyl, linoleoyl, linolenoyl, arachidoyl, arachidonoyl, behenoyl, erucoyl, and the like, and are generally obtained from edible triglyceride fats and oils such as cottonseed, soybean, coconut, rapeseed, peanut, olive, palm, palm kernel, corn, sunflower, safflower, sesame seed, rice bran, wallflower, nasturtium seed, mustard seed, Crambe seed, whale, sardine, herring, menhaden, and pilchard oil as well as from lard, tallow and the like.

Also suitable as part of the glycerides of the shortening are certain di- or triglycerides in which one or two of the hydroxyl groups of the glycerine have been esterified with "short-chain" fatty acids having from 2 to about 6 carbon atoms such as acetic, propionic, butyric, valeric, and caproic acids, and one or two of the remaining hydroxyl groups have been esterified with higher molecular weight fatty acids having from about 12 to about 22 carbon atoms.

The plastic shortening of this invention also can contain glycerides prepared by random or by low-temperature directed rearrangement or interesterification reactions of fatty triglyceride-containing fats and oils, such as interesterified cottonseed oil and lard; the glycerides can also be obtained by esterification reactions of synthetic or natural glycerine with higher molecule weight fatty acids having from about 12 to about 22 carbon atoms.

A preferred glyceride base for the plastic shortening of this invention comprises a partially hydrogenated vegetable oil having an iodine value of from about 70 to about 80 selected from the group consisting of cottonseed oil, soybean oil, and mixtures thereof.

The shortening base of this invention can be prepared by various known means for making it plastic and workable (moldable and spreadable) at room temperature. Of course, naturally-occurring plastic fats, such as lard, will not necessarily need any further treatment to solidify or plasticize them. Liquid oils generally can be converted to plastic shortenings by partial hydrogenation at the unsaturated double bonds of the fatty acid constituents of the oil followed by conventional chilling and crystallization techniques or by proper admixture with sufficient triglycerides which are solid at room temperature to form a rigidly interlocking structure which interferes with the free-flowing properties of the liquid oil. Suitable techniques for forming the plastic shortening are described, for example, in Bailey, Industrial Oil and Fat Products, at page 1064 et seq. (3d ed. 1964).

Although specific illustrative examples of glyceride shortening bases and methods of processing are described herein, this should not be taken as limiting the invention to any particular shortening base or method of processing. An essential and critical part of the invention is the employment in the glyceride shortening base of the hereinbefore described combination of three additives in the concentrations and proportions stated. As mentioned above, some of these additives can be purchased commercially. In general, however, they can be prepared as follows:

The monoesters of glycerol and fatty acid used in this invention can be pure esters of glycerol and fatty acids having from about 12 to about 22 carbon atoms such as, for example, monostearin, monoolein, and monopalmitin, or mixtures of esters containing such fatty acids. They are conveniently prepared by superglycerination of fats and oils which consists of reacting triglyceride fat or oil, for example, cottonseed or soybean oil, with excess glycerine in the presence of an alkaline catalyst such as sodium hydroxide.

Edeler and Richardson, U.S. Patents 2,206,167, 2,206,168, granted July 2, 1940, describe typical methods of making edible mono- and diglycerides by the superglycerination of fats. These mono- and diglyceride mixtures usually contain on the order of 40% to 60% monoglyceride, the balance comprising diglyceride and a smaller percentage of triglyceride. Such mixtures can be used in the practice of this invention provided that the total monoglyceride content in the glyceride shortening composition meets the hereinbefore stated concentrations and proportional requirements in relation to the other additives. The so-called "distilled" monoglyceride products which are characterized by having a higher monoglyceride content, commonly on the order of 90% or more, can also be used. Such products are marketed under the trade-mark "Myverol" and methods of making are described by Kuhrt, U.S. Patents 2,634,278, 2,634,279, granted Apr. 7, 1953, Kuhrt, U.S. Patent 2,701,769, granted Feb. 8, 1955, and Kuhrt and Welch, U.S. Patent 2,727,913, granted Dec. 20, 1955. A preferred monoglyceride is derived from partially hydrogenated vegetable oils (iodine value about 70 to about 80) containing fatty acid groups having from about 16 to about 18 carbon atoms.

The monoesters of propylene glycol and fatty acid used in this invention must be monoesters of fatty acids having from about 12 to about 22 carbon atoms such as, for example, lauric, myristic, palmitic, stearic, oleic, arachidic, and behenic acids or mixtures thereof. They can be prepared by reaction of propylene glycol with suitable fatty acids or commercial mixtures of various such acids such as double or triple pressed stearic acid, in the presence of acid or alkaline catalysts, to form monoesters by conventional esterification methods. By analogous methods, the propylene glycol can be reacted with fats having the corresponding fatty acid groups of the above-mentioned fatty acids, in the presence of acid or alkaline catalysts, to form similar monoesters by conventional interesterification methods. Other suitable methods for the preparation of partial esters of propylene glycol and fatty acid by direct esterification or interesterification are described by Arrowsmith et al., U.S.P. 2,383,581, granted Aug. 28, 1945, Allen et al., U.S.P. 2,478,354, granted Aug. 9, 1949, Logan, U.S.P. 2,669,572, granted Feb. 16, 1954, and Kuhrt, U.S.P. 2,634,278, granted Apr. 7, 1953. A preferred partial ester in this group of compounds is propylene glycol monostearate.

The monoesters of polyoxyethylene sorbitan used in the practice of this invention can be prepared, for example, by reacting polyoxyethylene sorbitan with fatty acids having from about 16 to about 18 carbon atoms, such as, for example, palmitic, stearic, and oleic acids or mixtures thereof, or by forming polyoxyethylene ethers of partial fatty acid sorbitan esters. Suitable methods of preparation are described in greater detail by Griffin, U.S.P. 2,380,166, granted July 10, 1945. Polyoxyethylene sorbitan monoesters are commercially marketed under the trade-mark "Tween" such as "Tween 60" and "Tween 80." These commercial materials are generally a complex mixture of compounds. Such mixtures are included within the scope of this invention. Polyoxyethylene (20) sorbitan monostearate which has an average of about 20 oxyethylene units per molecule is the preferred material in this group of emulsifiers.

It is preferable to acid treat commercially-obtainable polyoxyethylene sorbitan monoesters such as polyoxyethylene (20) sorbitan monostearate ("Tween 60") with sufficient acid to give them a pH of 6.5 to 7.0 in the presence of a trace of water. Edible acids such as phosphoric, citric, or hydrochloric acid can be used for this purpose. The trace of water need merely be an amount sufficient to enable the making of a conventional pH determination.

Although specific illustrative examples of compounds useful in this invention and specific methods of preparing them are described herein, this should not be taken as limiting the invention to these particular additives and methods of preparation.

Some combinations of the above additives give better overall results than other combinations; for example, one especially preferred combination contains about 6.5%, by weight of the shortening composition, of additives comprising about 65 parts by weight monoester of glycerol and fatty acid derived from partially hydrogenated vegetable oil containing fatty acid groups having from about 16 to about 18 carbon atoms and having an iodine value of from about 70 to about 80, and a complement of about 35 parts by weight of a mixture of (a) propylene glycol monostearate and (b) polyoxylethylene (20) sorbitan monostearate ("Tween 60") acid-treated to a pH of 6.5 to 7.0 in the presence of a trace of water, the weight ratio of (a) to (b) being about 3.5 to 1, in a plastic glyceride shortening base.

It is understood that the shortening of this invention can contain, if desired, minor amounts of conventional antitoxidants such as methyl silicone, butylated hydroxytoluene and butylated hydroxyanisole, preservatives such as sorbic acid, and coloring agents, for example, carotene.

The following more detailed example will serve to further illustrate the shortening of this invention and the substantial improvements over prior art shortenings. All ratios, and percentages are by weight unless otherwise stated.

Example 1

A plastic shortening was prepare by homogeneously mixing together the following components:

| Component: | Parts by weight |
|---|---|
| Partially hydrogenated blend of soybean (85%) and cottonseed (15%) oils (Iodine Value — 75) | 93.5 |
| Monoglycerides of vegetable oil containing fatty acid groups having 16 to 18 carbon atoms (Iodine Value—75) | 4.2 |
| Proplyene glycol monostearate | 1.8 |
| Polyoxyethylene (20) sorbitan monostearate ("Tween 60") acid-treated to a pH of 7.0 in the presence of a trace of water | 0.5 |

The above shortening example illustrates a preferred plastic shortening composition of this invention containing 6.5% of total additives comprising about 65 parts monoglycerides and 35 parts of a mixture of (a) propylene glycol monostearate and (b) polyoxyethylene (20) sorbitan monostearate, the ratio of (a) to (b) being about 3.5 to 1.

The above shortening was used to prepare high-ratio white and yellow cakes of high volume containing the following ingredients:

| | Parts by weight | |
|---|---|---|
| Ingredients | White cake (g.) | Yellow cake (g.) |
| Bleached cake flour | 454 | 454 |
| Shortening | 250 | 250 |
| Sugar, industrial fine | 636 | 636 |
| Salt (sodium chloride) | 17 | 17 |
| Baking powder ("Fleischmann") | 28 | 28 |
| Water | 382 | 434 |
| Nonfat milk solids | 45 | 45 |
| Egg white (frozen) | 341 | |
| Whole egge (fresh) | | 272 |

The above cake ingredients were mixed in a Hobart C–100 mixer (3-quart bowl) with paddle at #1 speed and baked according to the following procedure:

Mix flower and shortening 90 seconds; scrape down and mix another 90 seconds. Add sugar, salt, milk solids, baking powder and 182 grams of water. Mix 90 seconds, scrape down, and mix another 90 seconds. Add half of the remaining water and half of the egg. Mix 45 seconds, scrape down, and mix another 45 seconds. Add rest of water and egg. Mix 45 seconds, scrape down, and mix another 45 seconds.

Scale at 400 grams/8-inch pan. Bake at 375° F., (about 191° C.) for 20 minutes.

The above shortening was also used to prepare cream icings with high specific volume containing the following ingredients:

| | Parts by weight | |
|---|---|---|
| Ingredients | Icing A (g) | Icing B (g) |
| Sugar 6X | 908 | 908 |
| Shortening | 227 | 227 |
| Nonfat milk solids | 57 | 57 |
| Salt (sodium chloride) | 7 | 7 |
| Water | 155 | 227 |

The above icing ingredients were added to a 3-quart mixing bowl and mixed at #2 speed on a Hobart C–100 mixer with paddle for 2 minutes, scraped down, and then mixed an additional 10 minutes at #2 speed.

The volume of the above cakes was determined 20 minutes after the cakes were baked and is recorded below in CC's per 400 grams of batter. The volume of the above icings was determined immediately after mixing and is recorded as specific volume in terms of the reciprocal of density in grams per millileter.

| | |
|---|---|
| White cake volume | 1200 |
| Yellow cake volume | 1505 |
| Icing A, specific volume | 1.48 |
| Icing B, specific volume | 1.49 |

The above cake volumes illustrate the excellent high volumes obtained with the shortening composition of this invention and are more than 100 cc. greater than the volumes obtained with a conventional plastic shortening which contains the monoglyceride but not the other two shortening additives in the above cake formulas. The above cakes made with the shortenings of this invention also had a finer grain than the comparative cakes made with the above conventional plastic shortening containing only the monoglyceride additive.

The above icing volumes illustrate not only the high volumes obtained with the shortening composition of this invention but also the tolerance to wide variations in the amount of water which can be employed in the icing formula. Icing B contains 50% more water than Icing A, yet has substantially the same volume as Icing A. By way of comparison, a cream icing made with a conventional plastic shortening which contains the monoglyceride but not the other two additives of this invention has a specific volume of 10% less than the volume of Icing A and 30% less than the volume of Icing B when the corresponding proportions of water are used in the above icing formulas.

Example 2

Two devil's food cakes were prepared with the following ingredients:

Ingredients: Parts by weight, g.
 Bleached cake flour _____ 363
 Shortening _____ 250
 Sugar, industrial fine _____ 636
 Cocoa _____ 91
 Salt (sodium chloride) _____ 17
 Soda (sodium bicarbonate) _____ 6
 Baking powder ("Fleischmann") _____ 17
 Nonfat milk solids _____ 68
 Whole eggs _____ 340
 Water _____ 499

The above cake ingredients were mixed in a Hobart C–100 mixer (3-quart bowl) with paddle at #1 speed and baked according to the following procedure:

Mix above ingredients together (except eggs and 272 g. of the water) for two minutes; scrape down and mix another two minutes; scrape down. Add half of the eggs and half of the remaining water. Mix 45 seconds, scrape down, and mix another 45 seconds. Add rest of eggs and water. Mix 45 seconds, scrape down, and mix another 45 seconds.

Scale at 400 grams/8-inch pan. Bake at 375° F. (about 191° C.) for 25 minutes.

(a) In one cake the shortening consisted of the shortening set forth in Example 1, above, which contained the combination of monoglyceride, propylene glycol, and polyoxyethylene (20) sorbitan monostearate.

(b) In the other cake the shortening consisted of the shortening set forth in Example 1, above, which contained only the monoglyceride additive.

The differences in size of cakes (a) and (b) above is shown by the following center and edge heights of the cake layer:

| Cake | Center height (in.) | Edge height (in.) |
|---|---|---|
| (a) | 2.00 | 1.75 |
| (b) | 1.85 | 1.50 |

Cake (a) had a fine grain and showed no evidence of tunnels. Cake (b) did not have as fine a grain as cake (a) and also had several prominent tunnels. Devil's food cakes prepared with conventional shortenings have a tendency to develop tunnels during baking. The shortening of this invention, as illustrated above, substantially eliminates this tendency to develop tunnels.

Example 3

A comparison was made between the shortening of this invention and samples of other shortenings which contained only one or two of the three essential additives of the present invention or amounts of these additives outside the range of concentrations and proportions required herein. The comparison was made using white and yellow cakes and Icings A and B with ingredients as set forth in Example 1, above. The following table shows the cake and icing volumes obtained in this comparison.

TABLE I

| | Weight percent of additives | | | Cake volume, cc.'s/400 g. | | Icing, specific volume | |
|---|---|---|---|---|---|---|---|
| | MG | PGMS | POESMS | White | Yellow | A | B |
| (a) | 4.20 | 2.15 | 0.50 | 1,250 | 1,550 | 148 | 148 |
| (b) | 3.20 | 0 | 0 | 1,060 | 1,380 | 135 | 110 |
| (c) | 3.56 | 1.98 | 0 | (¹) | 1,500 | 122 | (¹) |
| (d) | 3.68 | 2.64 | 0 | (¹) | 1,500 | 111 | (¹) |
| (e) | 3.20 | 0 | 0.50 | (¹) | ³ 1,080 | 150 | 140 |
| (f) | 0.24 | 1.32 | 0.60 | (²) | (¹) | (¹) | (¹) |
| (g) | 0.48 | 2.64 | 0.60 | (²) | (¹) | (¹) | (¹) |

¹ Not tested.
² Bad dip in center.
³ Dip in center.
MG—Monoglycerides of vegetable oil containing fatty acid groups having 16 to 18 carbon atoms (Iodine Value—75); PGMS—Propylene glycol monostearate; POESMS—Polyoxyethylene (20) sorbitan monostearate.

Shortening (a) is illustrative of the invention described herein and shows excellent volume with both white and yellow layer cakes and with cream icings in comparison to shortenings (b) through (g). Shortening (b) which contains only monoglyceride additive was substantially poorer than shortening (a) in both cake and icing volume and did not show good tolerance to variations in the water content of icing. Shortenings (c) and (d) which contain both monoglyceride and proplyene glycol monostearate additives provided improved yellow layer cake volume but resulted in substantially poorer icing volume than shortening (b). Conversely, shortening (e) which contains both monoglyceride and polyoxyethylene (20) sorbitan monostearate additives provided improved icing volume but resulted in substantially poorer yellow layer cake volume than shortening (b). The use of all three of the essential additives of this invention but in concentrations and proportions outside the ranges defined herein [viz., shortenings (f) and (g)] produced white cake failures with a bad dip in the center of the cake.

Example 4

A yellow pound cake was prepared from ingredients and according to procedure as follows:

Ingredients: Parts by weight g.
 Bleached cake flour _____ 454
 Shortening _____ 318
 Sugar, industrial fine _____ 545
 Salt (sodium chloride) _____ 17
 Nonfat milk solids _____ 28
 Water _____ 204
 Whole eggs (fresh) _____ 318

Mix above ingredients together (except eggs) in a Hobart C–100 mixer (3-quart bowl) with paddle at #1 speed for three minutes; scrape down and mix another three minutes. Add about half of the eggs and mix 45 seconds. Scrape down and mix another 45 seconds. Add remainder of eggs; mix 45 seconds, scrape down; mix another 45 seconds.

Scale at 454 grams/lb. loaf pan. Bake at 350° F. (about 191° C.) for 60 to 75 minutes.

The shortening consisted of shortening (a) of Example 3 which contained 4.2% monoglyceride having 16 to 18 carbon atoms and an iodine value of 75, 2.15% propylene glycol monostearate, and 0.5% polyoxyethylene (20) sorbitan monostearate. The cake volume was 1320 cc./lb. of batter. This volume is substantially greater than the 1190 cc./lb. of batter obtained by following the above formula and procedure except for the substitution of a shortening containing only the monoglyceride additive for the above shortening containing the combination of additives.

Example 5

A sweet dough was prepared according to the following recipe:

Ingredients: Pounds
Sugar _____ 1
Shortening _____ 1
Salt (sodium chloride) _____ 1/16
Bread flour _____ 3
Pastry flour _____ 1½
Whole eggs _____ ¾
Nonfat milk solids _____ ¼
Water _____ 2
Yeast (Fleischmann's compressed) _____ ½

Mixing.—Place all dry ingredients in a Hobart bowl (1-quart size). Then at medium speed add the liquid ingredients in which the yeast has been dissolved. Continue mixing to a smooth, well-developed dough that cleans the bowl.

Fermentation.—Bring dough from mixer at 78° F. to 85° F. Allow dough to double in size, then punch down to its original volume. Let dough rise again until it is half-again to twice its original volume.

Make-up.—Cut dough into six 10-ounce pieces. Round the pieces into balls. Roll each ball into a circle having a diameter of eight inches. Place dough in greased eight-inch pans and proof until doubled in size.

Bake.—Bake at 375° F. for 10 to 15 minutes.

The shortening used was the same as in Example 3(a) containing 4.2% monoglyceride having 16 to 18 carbon atoms and an iodine value of 75, 2.16% propylene glycol monostearate, and 0.5% polyoxyethylene (20) sorbitan monostearate. The baked sweet dough had a volume of 2915 cc./lb. of dough. This is substantially greater than the 2620 cc./lb. of dough obtained by following the above recipe except for the substitution of a shortening containing only the monoglyceride additive for the above shortening containing the combination of additives.

The above sweet dough prepared according to the invention herein was also substantially softer and more tender than the comparative sweet dough prepared above. This improved softness and tenderness was shown by the greater penetration value of 340 obtained with the sweet dough of this invention versus the penetration value of 325 obtained with the comparative sweet dough. The penetration values were obtained by placing a standard grease cone (ASTM D-217) on top of the baked sweet dough and measuring the number of tenths of a millimeter the cone penetrated the dough in five seconds.

Example 6

The importance of the ratio of the (a) monoester of propylene glycol to the (b) monoester of polyoxyethylene sorbitan as defined herein is illustrated by this example. Three high-ratio white cakes were prepared according to the cake formula and procedure of Example 1. One of these cakes contained the shortening of this invention illustrated by Example 3(a). The other two cakes contained the same additives in the shortening but the ratio of the (a) monoester of propylene glycol to the (b) monoester of polyoxyethylene sorbitan was respectively, too high and too low. The following table, Table II, records the specific amounts of additives and the white cake results of this example.

TABLE II

| Weight percent of additives | | | Ratio PGMS/ POESMS | Cake results |
|---|---|---|---|---|
| MG | PGMS | POESMS | | |
| 4.20 | 2.15 | 0.5 | 4.3 | 1,250 cc./400 g. batter cake volume. |
| 4.20 | 3.75 | 0.25 | 15.0 | Bad dip in center of cake. |
| 4.00 | 1.0 | 2.0 | 0.5 | Do. |

MG—Monoglyceride of vegetable oil containing fatty acid groups having 16 to 18 carbon atoms (iodine value—75); PGMS—Propylene glycol monostearate; POESMS—Polyoxyethylene (20) sorbitan monostearate.

The white cakes with the bad dips in the center are unacceptable from a consumer standpoint. The volume of these cakes was substantially less than 1250 cc./400 grams of batter as determined visually.

What is claimed is:

1. An all-purpose, plastic, glyceride shortening composition for use in commercial baking operations which comprises a shortening base containing from about 4.5% to about 8.0%, by weight of the shortening composition, of a combination of additives totalling about 100 parts by weight consisting essentially of from about 55 to about 75 parts by weight of monoester of blycerol and fatty acid having from about 12 to about 22 carbon atoms and a complement of from about 45 to about 25 parts by weight of a mixture of (a) monoester of propylene glycol and fatty acid having from about 12 to about 22 carbon atoms and (b) monoester of polyoxyethylene sorbitan containing about 20 oxyethylene units per molecule and fatty acid having from about 16 to about 18 carbon atoms, the ratio of (a) to (b) being from about 3.5 to about 4.3 parts by weight of (a) to about one part by weight of (b), and the concentration of (a) not exceeding about 2.4% of the weight of the total shortening composition.

2. The composition of claim 1 in which the monoester of glycerol is derived from partially hydrogenated vegetable oil containing fatty acid groups having from about 16 to about 18 carbon atoms and having an iodine value of from about 70 to about 80.

3. The composition of claim 1 in which the monoester of propylene glycol is propylene glycol monostearate.

4. The composition of claim 1 in which the monoester of polyoxyethylene sorbitan is polyoxyethylene (20) sorbitan monostearate.

5. The composition of claim 1 in which the shortening base comprises a partially hydrogenated vegetable oil having an iodine value of from about 70 to about 80 selected from the group consisting of cottonseed oil, soybean oil, and mixtures thereof.

6. An all-purpose, plastic, glyceride shortening composition for use in commercial baking operations which comprises a shortening base containing from about 4.5% to about 8.0%, by weight of the shortening composition, of a combination of additives totalling about 100 parts by weight consisting essentially of from about 55 to about 75 parts by weight monoester of glycerol and fatty acid derived from partially hydrogenated vegetable oil containing fatty acid groups having from about 16 to about 18 carbon atoms and having an iodine value of from about 70 to about 80 and a complement of from about 45 to about 25 parts by weight of a mixture of (a) propylene monostearate and (b) polyoxyethylene (20) sorbitan monostearate, the ratio of (a) to (b) being from about 3.5 to about 4.3 parts by weight of (a) to about one part by weight of (b), and the concentration of (a) not exceeding about 2.4% of the weight of the total shortening composition.

7. The composition of claim 6 in which the shortening base comprises a partially hydrogenated vegetable oil having an iodine value of from about 70 to about 80 selected from the group consisting of cottonseed oil, soybean oil, and mixtures thereof.

8. An all-purpose, plastic, glyceride shortening composition for use in commercial baking operations which comprises a shortening base containing about 6.5%, by weight of the shortening composition, of a combination of additives consisting essentially of about 65 parts by weight monoester of glycerol and fatty acid derived from partially hydrogenated vegetable oil containing fatty acid groups having from about 16 to about 18 carbon atoms and having an iodine value of from about 70 to about 80, and a complement of 35 parts by weight of a mixture of (a) propylene glycol monostearate and (b) polyoxyethylene (20) sorbitan monostearate acid-treated to provide a pH of 6.5 to 7.0 in the presence of a trace of water, the ratio of (a) to (b) being about 3.5 to about 1.

9. The composition of claim 8 in which the shortening base comprises a partially hydrogenated vegetable oil having an iodine value of from about 70 to about 80 selected from the group consisting of cottonseed oil, soybean oil, and mixtures thereof.

References Cited
UNITED STATES PATENTS

| | | | |
|---|---|---|---|
| 3,117,010 | 1/1964 | Geisler | 99—118 |
| 3,246,992 | 4/1966 | Nozuick et al. | 99—139 |

MAURICE W. GREENSTEIN, *Primary Examiner.*

U.S. Cl. X.R.

99—92, 122, 139